(12) United States Patent  
Richards et al.

(10) Patent No.: US 10,112,587 B2  
(45) Date of Patent: Oct. 30, 2018

(54) ELECTRONIC BRAKING SYSTEM

(71) Applicant: NACCO Materials Handling Group, Inc., Fairview, OR (US)

(72) Inventors: Duane Richards, Fairview, OR (US); Rajdeep Dogra, Fairview, OR (US); Walter Goska, Fairview, OR (US); James Anderson, Fairview, OR (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 255 days.

(21) Appl. No.: 14/975,170

(22) Filed: Dec. 18, 2015

(65) Prior Publication Data

US 2017/0174189 A1 Jun. 22, 2017

(51) Int. Cl.
| | |
|---|---|
| *B60T 7/04* | (2006.01) |
| *G05G 1/30* | (2008.04) |
| *B60T 7/06* | (2006.01) |
| *G05G 1/38* | (2008.04) |

(52) U.S. Cl.
CPC ............... *B60T 7/06* (2013.01); *B60T 7/042* (2013.01); *G05G 1/30* (2013.01); *G05G 1/38* (2013.01); *B60T 2270/82* (2013.01)

(58) Field of Classification Search
CPC ... B60T 7/04; B60T 7/042; B60T 7/06; B60T 2270/82; B60T 13/745; G05G 1/30
See application file for complete search history.

(56) References Cited

U.S. PATENT DOCUMENTS

| | | | |
|---|---|---|---|
| 4,181,834 A | 1/1980 | Kyonomine | |
| 4,356,471 A | 10/1982 | Nienaber | |
| 5,729,979 A | 3/1998 | Shaw et al. | |
| 5,803,555 A | 9/1998 | Schaefer | |
| 5,943,938 A | 8/1999 | Okuno et al. | |
| 6,167,778 B1 | 1/2001 | Kohlen | |
| 6,571,661 B1 | 6/2003 | Hemenway et al. | |
| 6,655,230 B1 | 12/2003 | Rupp et al. | |

(Continued)

FOREIGN PATENT DOCUMENTS

| | | |
|---|---|---|
| CN | 201659891 | 12/2010 |
| DE | 102009047263 | 6/2010 |

(Continued)

OTHER PUBLICATIONS

Toyota Hybrid System Diagnosis, Brake System, Course 027, Section 6, pp. 6-1-6-8.

*Primary Examiner* — Adam D Rogers

(74) *Attorney, Agent, or Firm* — Schwabe Williamson & Wyatt

(57) ABSTRACT

A vehicle braking system includes a service brake pedal and a sensing device configured to monitor a position of the service brake pedal. A processing device is configured to control an amount of braking force provided by the vehicle braking system as a function of the position of the service brake pedal. The braking system further includes a return spring operatively coupled to the service brake pedal and configured to provide a substantially linear pedal effort feedback during an initial range of motion of the service brake pedal. Additionally, a damping device that operates in compression as the service brake pedal is depressed is configured to provide a substantially non-linear pedal effort feedback during a subsequent range of motion of the service brake pedal.

18 Claims, 10 Drawing Sheets

(56) References Cited

U.S. PATENT DOCUMENTS

| | | | |
|---|---|---|---|
| 7,228,758 B2 | 6/2007 | Fujiwara | |
| 8,226,175 B2* | 7/2012 | Drott | B60T 8/4077 |
| | | | 303/114.3 |
| 8,376,098 B2 | 2/2013 | Campbell | |
| 8,646,356 B2 | 2/2014 | Horie et al. | |
| 8,914,191 B2* | 12/2014 | Bohn | B60T 7/042 |
| | | | 303/115.2 |
| 8,985,714 B2* | 3/2015 | von Hayn | B60T 7/042 |
| | | | 303/113.3 |
| 9,061,673 B2* | 6/2015 | Weiberle | B60T 7/042 |
| 9,079,570 B2* | 7/2015 | Sellinger | B60T 7/042 |
| 9,139,168 B2* | 9/2015 | Jeon | B60T 7/042 |
| 9,141,129 B2* | 9/2015 | Kim | G05G 5/03 |
| 9,283,939 B2* | 3/2016 | Kim | B60T 8/409 |
| 9,290,163 B2* | 3/2016 | Ryu | B60T 7/042 |
| 9,387,836 B2* | 7/2016 | Ryu | B60T 7/06 |
| 9,663,086 B2* | 5/2017 | Ozeki | B60T 7/042 |
| 9,796,367 B2* | 10/2017 | Miyata | B60T 13/141 |
| 9,802,585 B2* | 10/2017 | Kollath | B60T 7/06 |
| 2005/0082909 A1 | 4/2005 | Constantakis | |
| 2010/0012442 A1 | 1/2010 | Koo et al. | |
| 2014/0117602 A1 | 5/2014 | Jeon | |
| 2014/0360177 A1* | 12/2014 | Ryu | B60T 8/4081 |
| | | | 60/556 |
| 2014/0361473 A1 | 12/2014 | Ryu et al. | |
| 2017/0107088 A1* | 4/2017 | Xiaoxian | B66F 9/07509 |

FOREIGN PATENT DOCUMENTS

| | | |
|---|---|---|
| DE | 102010000882 | 7/2010 |
| DE | 102012112001 | 4/2014 |
| JP | 2009073478 | 4/2009 |

* cited by examiner

A-A

ELECTRONIC BRAKING SYSTEM

TECHNICAL FIELD

This application relates to the field of vehicle braking systems, including electronic braking systems configured for use with industrial vehicles such as forklifts.

BACKGROUND

Conventional regenerative braking systems may use the vehicle's momentum to recharge a battery or other energy storage device as the vehicle is decelerated. During regenerative braking, the vehicle motor may effectively operate in a reverse direction, or more specifically as a generator. The amount of braking effort provided by the regenerative braking system may be a function of the battery charging amperage.

Certain types of vehicle brake systems may include both a hydraulic brake system and a regenerative braking system. In industrial vehicles such as forklifts, regenerative braking may be applied when the operator removes their foot from the accelerator pedal, such that regenerative braking may gradually slow the forklift down. However, when the operator presses on the service brake pedal, a mechanical or hydraulic brake system may be actuated in order to brake the vehicle to a stop. The amount of braking force provided by the hydraulic brake system is typically a function of how much pedal effort is being applied by the operator.

While most of the energy from relatively gentle braking can be recovered in the regenerative braking system, any excess energy that is created from heavy braking in particular, and that is over the charging limits of the regenerative braking system, may be wasted as heat. As a result, known braking systems may be designed to control or balance the brake forces associated with the regenerative braking system and the hydraulic brake system to minimize the amount of energy lost to heat and friction. However, this creates a complexity in braking system design and presents challenges in providing the operator with a consistent and expected operating experience as the vehicle attempts to integrate the two types of braking systems.

Some types of electronic braking systems may be configured to generate a particular pedal stroke response as the brake pedal is being pressed by the operator. However, when the vehicle transitions to the hydraulic brake system, such as when the service brakes are applied, the operator may experience a significant change in effort required to press the brake pedal as a result of the hydraulic fluid being forced into the brake lines of the hydraulic brake system.

This application addresses these and other problems.

SUMMARY

A vehicle braking system is disclosed herein. The system may include a service brake pedal and a sensing device configured to monitor a position of the service brake pedal. A processing device may be configured to control an amount of braking force provided by the vehicle braking system as a function of the position of the service brake pedal. The braking system may further include a return spring operatively coupled to the service brake pedal and configured to provide a substantially linear pedal effort feedback during an initial range of motion of the service brake pedal. Additionally, a damping device may operate in compression as the service brake pedal is depressed to provide a substantially non-linear pedal effort feedback during a subsequent range of motion of the service brake pedal.

A vehicle braking device is disclosed herein. The vehicle braking device may comprise a cylindrical shaped containment structure, and an elastically deformable body comprising a first end and a second end. The first end may be located within the cylindrical shaped containment structure, and an annular space may be formed between the elastically deformable body and an inner surface of the containment structure. A first stud plate may be configured to attach the first end of the elastically deformable body to a lower surface of the containment structure. A second stud plate attached to the second end may be configured to evenly distribute a compression force applied to the elastically deformable body, such as during a vehicle braking operation. The elastically deformable body may be configured to radially deform into the annular space in response to the applied compression force.

A method of actuating an electronic braking system is disclosed herein. The method may comprise monitoring, with a sensing device, a brake pedal position associated with a service brake pedal, and generating a brake signal as a function of the brake pedal position. An amount of braking force applied by the electronic braking system may be determined based, at least in part, on the brake signal. The method may further comprise generating a first range of pedal effort feedback in response to the service brake pedal being moved through an initial range of pedal stroke. The first range of pedal effort feedback may be generated as a substantially linear function of the brake pedal position within the initial range of pedal stroke. Additionally, a second range of pedal effort feedback may be generated in response to the service brake pedal being moved through a subsequent range of pedal stroke. The second range of pedal effort feedback may be generated as a substantially non-linear function of the brake pedal position within the subsequent range of pedal stroke.

Additionally, an apparatus and/or system is disclosed herein, including means for performing the above described method.

DETAILED DESCRIPTION

Figure 1:
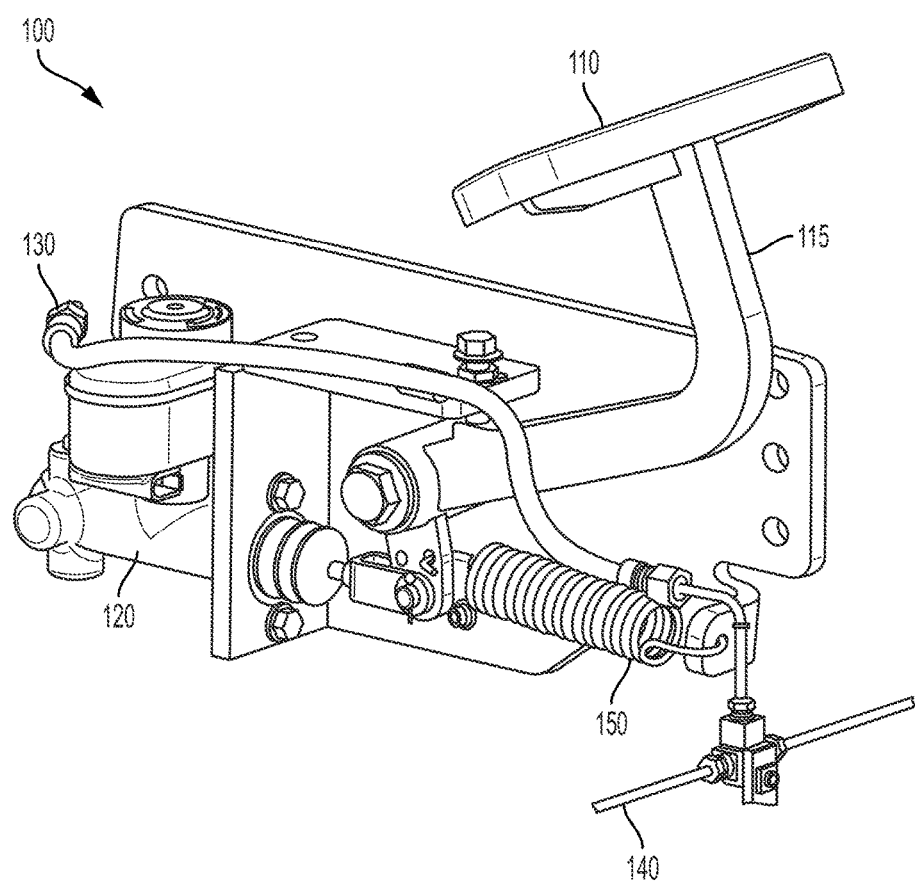
FIG. 1 illustrates an example vehicle braking system configured to provide hydraulically actuated brakes.

FIG. 1 illustrates an example vehicle braking system 100 comprising hydraulically actuated brakes. A brake pedal 110 provides a vehicle operator with a point of control in operating the vehicle brakes that provide a braking force to slow down or stop a vehicle, such as a forklift or other type of industrial vehicle. Brake pedal 110 may be attached to a brake pedal arm 115 that is configured to pivot or rotate in response to the depression of the brake pedal 110. Additionally, brake pedal arm 115 may be operatively coupled to brake pedal linkage that actuates a hydraulic cylinder 120 in response to the rotation of brake pedal arm 115.

The hydraulic cylinder 120, or master cylinder, may be configured to apply a hydraulic force that causes fluid to pass through a hydraulic supply line 130 and into the hydraulic brake lines 140 to engage the vehicle brakes. As the hydraulic fluid is being applied to engage the vehicle brakes, pressure builds within the hydraulic braking system and provides a resistance to the downward motion of brake pedal 110. As a result, the operator experiences a varying degree of pedal resistance or pedal effort during the brake pedal stroke as the pedal displacement is converted to a braking force. The pedal resistance provided via the hydraulic braking system, and for that matter the pedal effort provided by the operator, may be non-linearly related to the pedal stroke. Rather, the pedal effort may correspond to the non-linear increase in hydraulic pressure within the hydraulic braking system as the vehicle brakes are being applied.

The hydraulic pressure that is generated in a conventional hydraulic braking system primarily provides pedal resistance in a single direction, during the depression of the brake pedal. Accordingly, a spring 150 may be configured to provide a force that returns brake pedal 110 to an upright, neutral, or non-braking position. Spring 150 may provide additional pedal resistance as the operator depresses brake pedal 110, such that the spring force is combined with the resistance provided by the hydraulic brake system. The spring force provided by spring 150 may be generated as a linear function of the distance that spring 150 is extended, or as a linear function of the distance that the brake pedal 110 is depressed.

Figure 2:
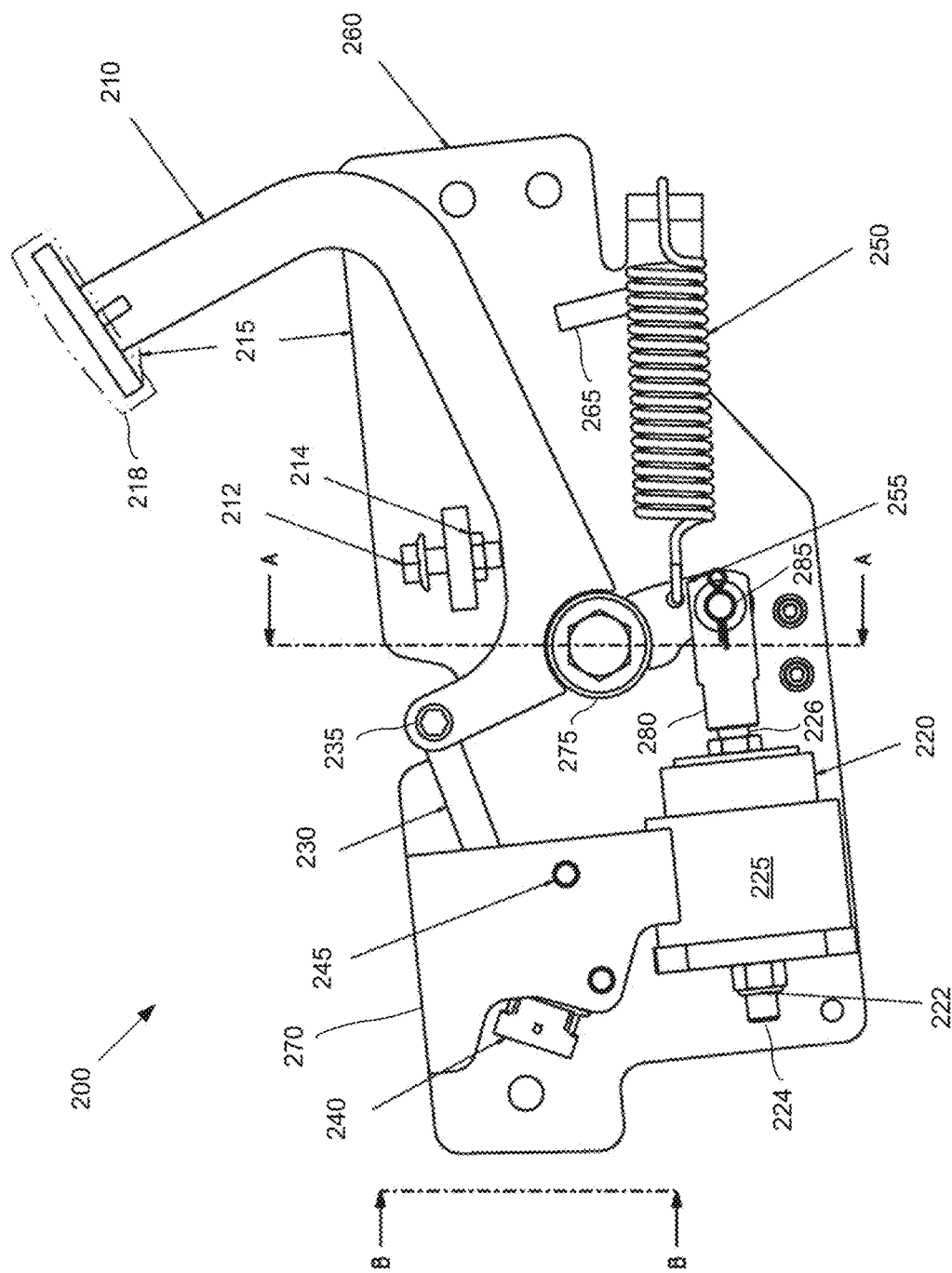
FIG. 2 illustrates an example vehicle braking system configured to provide electronically actuated brakes.

FIG. 2 illustrates an example vehicle braking system 200 configured to provide electronically actuated brakes. A brake pedal assembly including pedal arm 210 is shown rotationally connected to a frame 260 via a pedal pivot 275. As the operator presses the brake pedal 218, pedal arm 210 may rotate in a generally downward direction such that a distance 215 between the brake pedal 218 and frame 260 decreases. In some examples, distance 215 may represent the approximate height of the brake pedal 218 above a floorboard or a lower cowling of an operator compartment.

A damping device 220 may be configured to provide resistance to the generally downward rotation of pedal arm 210, such as when the brake pedal 218 is being depressed by the operator. Additionally, a return spring 250 may be configured to provide a spring force that operates to return the brake pedal 218 to a neutral, upright, or non-braking position, such as when the operator's foot is removed from the brake pedal 218. This neutral position of the brake pedal 218 may be constrained and/or determined according to an up-stop 214. Pedal arm 210 may be configured to contact up-stop 214 when the brake pedal 218 is in the neutral position.

Additionally, a down-stop 265 may be configured to limit the amount of rotation of pedal arm 210 in the downward braking direction. In some examples, down-stop 265 may be configured to limit the rotation of pedal arm 210 to approximately ten degrees of rotation. One or both of up-stop 214 and down-stop 265 may be rigidly attached to frame 260.

Return spring 250 may also be configured to provide further resistance to the generally downward rotation of pedal arm 210, together with the resistance provided by damping device 220. In some examples, return spring 250 may be configured to operate in tension and damping device 220 may be configured to operate in compression, in response to the generally downward rotation of pedal arm 210.

Pedal arm 210 may be operatively coupled to braking linkage, such as a clevis assembly 255. Both damping device 220 and return spring 250 may be operatively coupled to clevis assembly 255. A first end of return spring 250 may be operatively coupled to clevis assembly 255, and a second end of return spring 250 may be operatively coupled to frame 260. Damping device 220 may be operatively coupled to clevis assembly 255 via a damping arm 280 and/or a damping pivot 285.

Additionally, a push rod 226 may be operatively coupled to damping arm 280 to apply a compressive force on damping device 220. Damping arm 280 may be threaded onto push rod 226 and may be configured to adjust the position and/or amount of stroke of push rod 226 relative to the rotation of pedal arm 210.

Damping device 220 may be at least partially housed within a container 225. In some examples, container 225 may be rigidly mounted to frame 260 via a connecting rod 224. In response to the compressive force applied by push rod 226, damping device 220 may be pressed into or against container 225. Damping device 220 may be configured to deform as a result of the compressive force, and the amount of brake pedal resistance experienced by the operator may be determined, at least in part, by the amount of deformation of damping device 220.

In some examples, the amount of damping force provided by damping device 220 during rotation of pedal arm 210 may be adjusted by loosening or tightening a damping adjustment device 222, such as a locknut threaded on connecting rod 224. Additionally, the neutral position of pedal arm 210 may be adjusted via a brake pedal adjustment device 212. By changing the neutral position of the pedal arm 210, the initial amount of pedal resistance experienced by the operator when the brake pedal 218 is being depressed may be adjusted.

Pedal arm 210 may be operatively coupled to additional braking linkage, such as a pedal position arm 230. The relative position of pedal position arm 230 may be monitored by a sensing device 240. For example, pedal position arm 230 may be operatively coupled to pedal arm 210 by pedal position pivot 235. As pedal arm 210 is rotated about pedal pivot 275, pedal position arm 230 may be inserted into, or withdrawn from, a sensor housing 270, depending upon the direction of rotation of pedal arm 210.

Sensing device 240 may be configured to monitor one or both of the direction of motion, and the relative position of, position arm 230 within sensor housing 270. The movement of position arm 230 relative to sensing device 240 may be limited by contact between pedal arm 210 and one or both of up-stop 214 and down-stop 265. In some examples, sensing device 240 may be operatively coupled to sensor housing 270 via a sensor pin 245.

Figure 3:
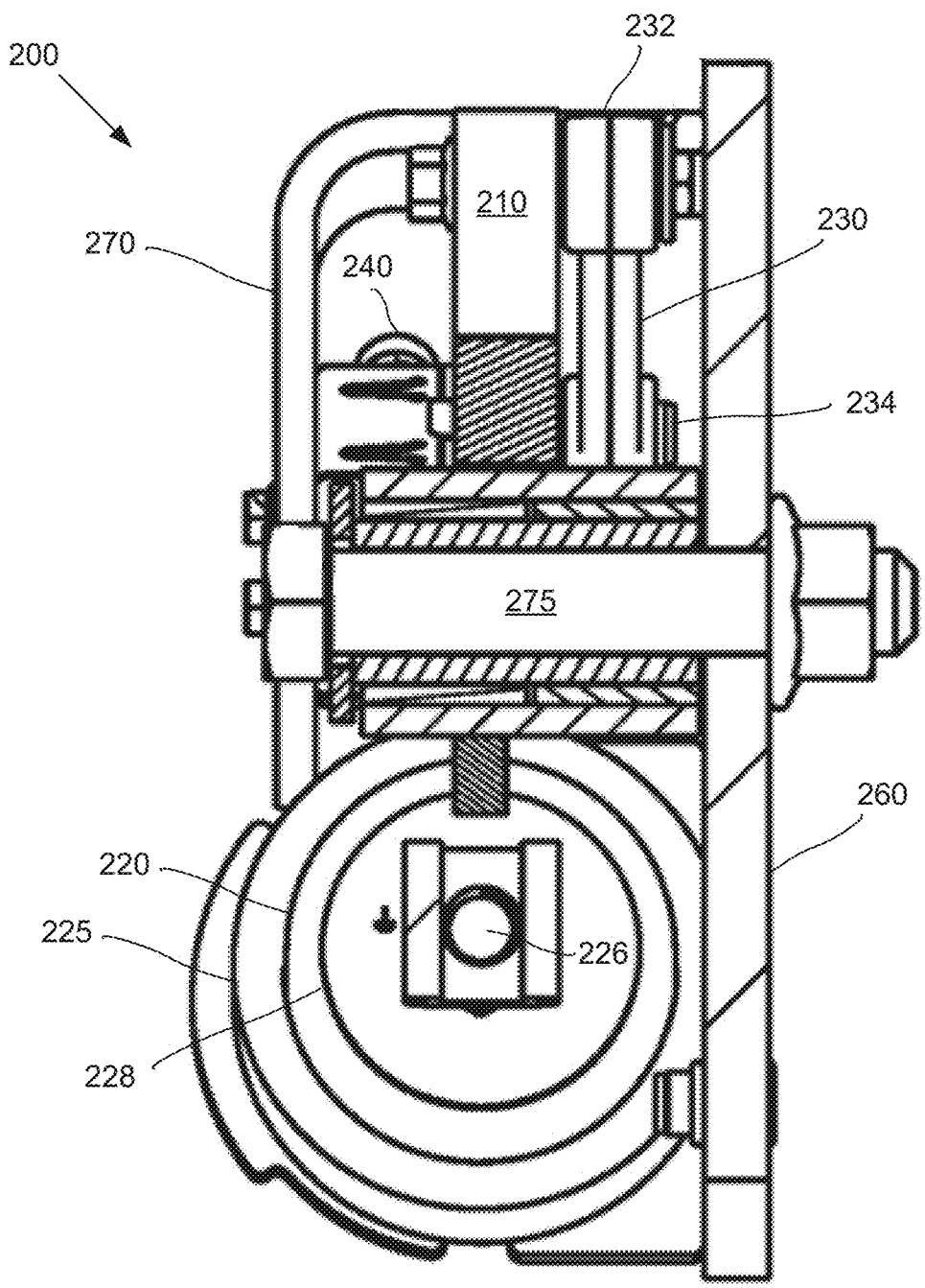
FIG. 3 illustrates a cross-sectional view of the example vehicle braking system of FIG. 2.

FIG. 3 illustrates a cross-sectional view A-A of the example vehicle braking system 200 of FIG. 2. A first end 232 of pedal position arm 230 is shown operatively connected to pedal arm 210, whereas a second end 234 of pedal position arm 230 is shown as being located within sensor housing 270. Accordingly, at least a portion of both pedal position arm 230 and sensing device 240 may be at least partially located within sensor housing 270.

Pedal pivot 275 is shown penetrating through frame 260 and secured by one or more nuts or similar fastening devices. In some examples, sensor housing 270 may be welded or otherwise rigidly attached to frame 260.

Push rod 226 is shown as being positioned along the approximate axial centerline of damping device 220. In some examples, a compression plate 228 may be configured to transfer the compressive force applied by push rod 226 against the face of damping device 220 and to provide a more even distribution of the compressive force when the brake pedal is depressed.

Figure 4:
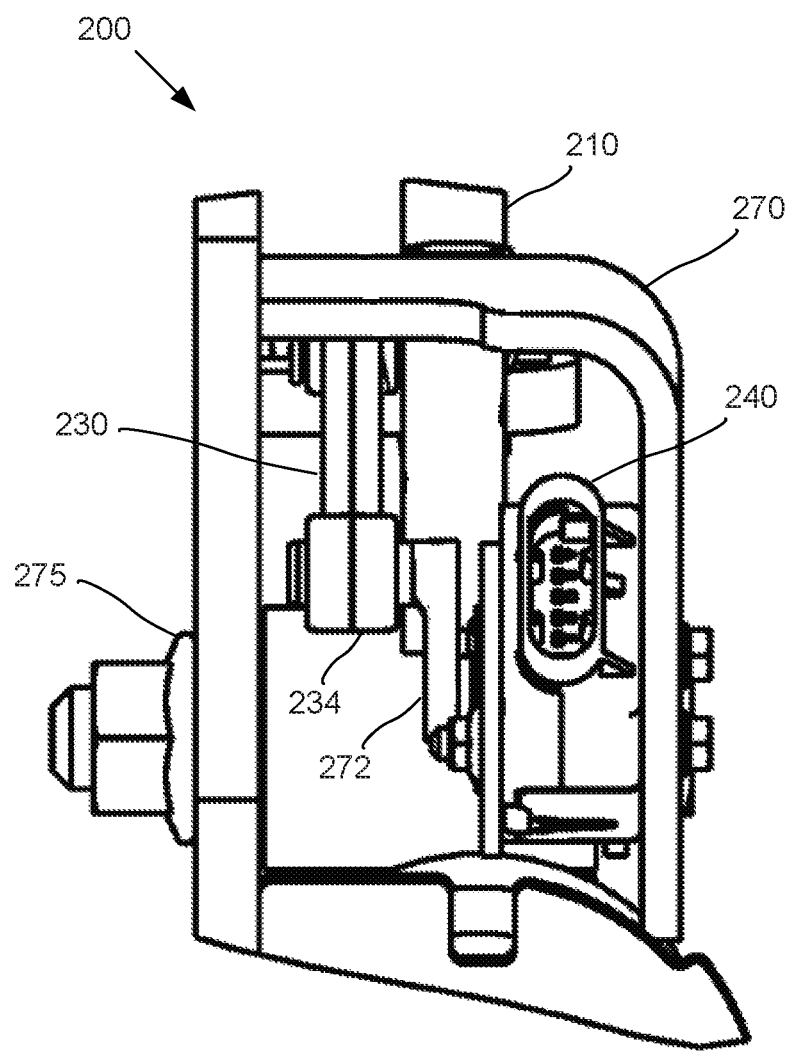
FIG. 4 illustrates a partial rear view of the example vehicle braking system of FIG. 2.

FIG. 4 illustrates a partial rear view B-B of the example vehicle braking system 200 of FIG. 2, showing an opposite side of the sensor housing 270 as was illustrated in FIG. 3. The second end 234 of pedal position arm 230 is shown operatively coupled to a sensor arm 272. Sensor arm 272 may in turn be operatively coupled to sensing device 240.

As pedal arm 210 is rotated about pedal pivot 275, the resulting movement of the second end 234 of pedal position arm 230 may in turn cause a rotational or positional displacement of sensor arm 272. The relative motion of sensor arm 272 may be monitored by sensing device 240. In some examples, sensor arm 272 may be rotationally coupled to sensing device 240.

Sensing device 240 may be configured to generate a signal in response to determining the rotational angle and/or the position of sensor arm 272. The signal may be associated with a voltage that varies according to the angle or position of the sensor arm 272. For example, a relatively small voltage signal may indicate that the brake pedal has only partially been depressed, whereas a relatively large voltage signal may indicate that the brake pedal has been fully depressed. An electronic braking system may respond to the voltage signal received from sensing device 240 by applying a corresponding amount of braking force. In some examples, the voltage signal may correspond to a particular amount of braking force via a lookup table or data set.

Whereas the amount of braking force applied by the vehicle braking system 200 may be determined from the rotational angle and/or the position of sensor arm 272, the amount of resistance or pedal effort that is generated by the vehicle braking system 200 as a function of the brake pedal displacement may be a means of providing the operator with feedback as to how much braking force is being applied.

Figure 5:
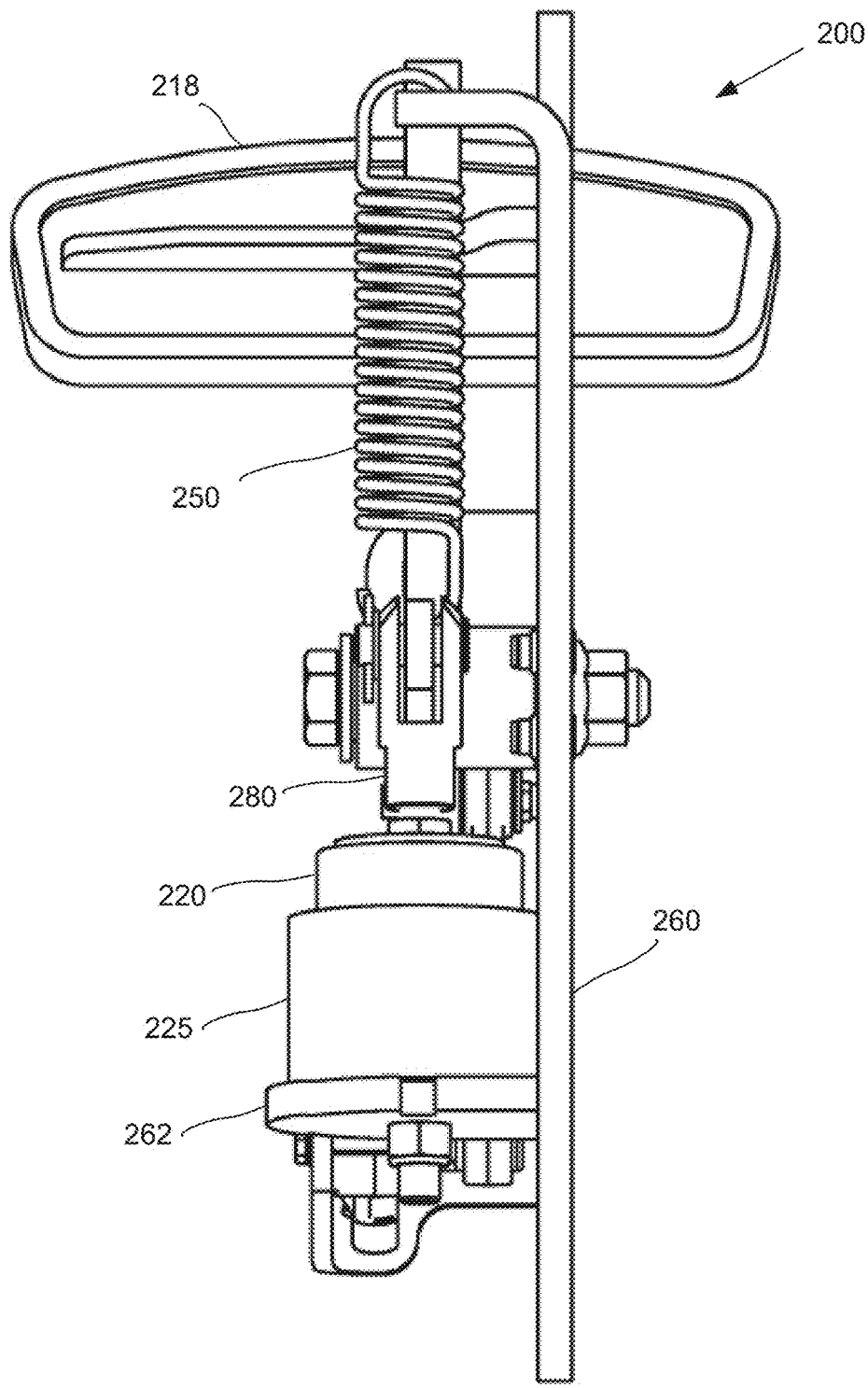
FIG. 5 illustrates a bottom view of the example vehicle braking system of FIG. 2.

FIG. 5 illustrates a bottom view of the example vehicle braking system 200 of FIG. 2. Container 225 may be rigidly attached to frame 260 by a bumper plate 262. Bumper plate 262 may be welded or otherwise attached to frame 260. In response to the depression of the brake pedal 218 or other type of brake actuation device, the corresponding movement of damping arm 280 may cause damping device 220 to be pressed into container 225 and/or against bumper plate 262.

In some examples, a lower end of damping device 220, opposite damping arm 280, may contact the interior surface of bumper plate 262. As damping arm 280 transfers the applied force from actuation of the brake pedal 218, the contact with bumper plate 262 may cause damping device 220 to expand or deform against the inner cylindrical surface of container 225.

When the operator's foot is removed from the brake pedal 218, or when there is otherwise a sufficient reduction in pedal effort exerted by the operator, return spring 250 may be configured to pull damping arm 280 back away from damping device 220. In some examples, the contained end of damping device 220 may be adhered to bumper plate 262 such that damping device 220 is not inadvertently withdrawn from container 225.

Figure 6:
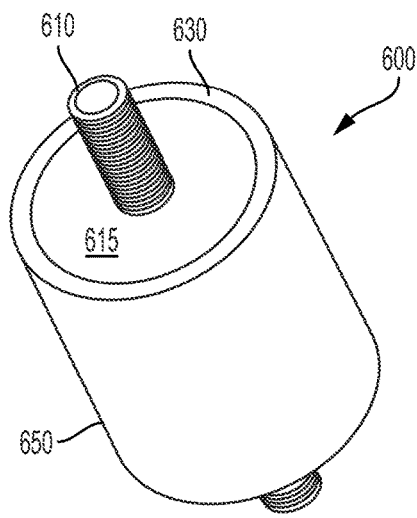
FIG. 6 illustrates an example damping device configured for use in a vehicle braking system.

FIG. 6 illustrates an example damping device 600 configured for use in a vehicle braking system, such as vehicle braking system 200 of FIG. 2. Damping device 600 may operate as a bumper that is configured to absorb compressive force exerted in a longitudinal or axial direction. A push rod 610 may be operatively coupled to, or manufactured to be integral with, a damping plate 615. Damping plate 615 may be located and/or adhered against an axial face of damping device 600 and, in some examples, may be seated within a circumferential ring 630 of damping device 600.

The body 650 of damping device 600 may substantially consist of neoprene, latex, silicone, epichlorohydrin (ECH), santoprene, other types of rubber, elastomers, or elastically deformable materials, or any combination thereof. The circumferential ring 630 may consist of the same material as the damping body 650, and both the ring 630 and damping body 650 may be formed together as an integrated structure during assembly of damping device 600. In some examples, ring 630 and/or damping body 650 may be molded about damping plate 615, such as during an injection molding process, effectively adhering damping plate 615 to the damping body 650.

Materials such as neoprene have been found to provide chemical resistance to physical degradation which might otherwise be caused by hydraulic oil, transmission fluids, and petroleum-based cleaners. Additionally, certain characteristics of neoprene, such as stiffness, may be less sensitive to variations in temperature and other operating conditions as compared with other elastic materials.

Figure 7:
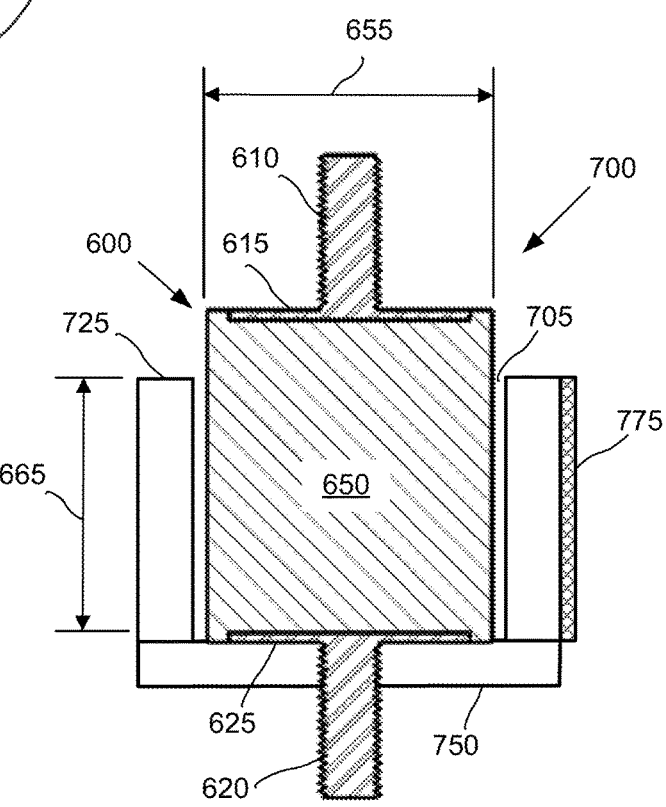
FIG. 7 illustrates a cross-sectional view of an example brake pedal effort simulation device including the damping device of FIG. 6.

FIG. 7 illustrates a cross-sectional view of an example brake pedal effort simulation device 700 including the damping device 600 of FIG. 6. Brake pedal effort simulation device 700 may comprise a tubular shaped containment structure 725 which surrounds the lower or contained portion of the damping body 650. Containment structure 725 may comprise one or more walls having a height 665 which may be equal to or less than the axial length of the damping body 650. In some examples, an upper portion of the damping body 650 may extend above the wall of containment structure 725.

The lower portion of the damping body 650 may be located against and/or placed in contact with a mounting plate 750. The wall of containment structure 725 may be welded to or otherwise attached to mounting plate 750 to form a unitary structure. One or both of mounting plate 750 and containment structure 725 may be manufactured out of metal such as steel or aluminum, other types of materials including plastic, or any combination thereof.

Damping device 600 may be bolted to mounting plate 750. A connecting rod 620 may be operatively coupled to, or manufactured to be integral with, an attachment plate 625. Attachment plate 625 may be located against an interior axial face of damping device 600 and, in some examples, may be seated within a circumferential ring of damping device 600, similar to ring 630 (FIG. 6).

One or both of damping plate 615 and attachment plate 625 may be adhered to, or otherwise attached to, the respective axial faces of the damping body 650. Additionally, connecting rod 620 may pass through mounting plate 750. In some examples, connecting rod 620 may be configured to secure damping device 600 to the mounting plate 750, such as by screwing a bolt onto connecting rod 620.

A circumferential gap 705 may be formed between the damping body 650 and containment structure 725. When push rod 610 and/or damping plate 615 apply compressive force against the exterior axial face of damping device 650, the sides of the damping body 650 may expand latterly or otherwise deform to contact the inner surface of containment structure 725. In the deformed state of damping body 650, the circumferential gap 705 may substantially be closed or filled with the deformed material of damping body 650 as damping plate 615 is pushed towards attachment plate 625.

In some examples, the height of the damping body 650 may be approximately the same height 665 as containment structure 725, such as when the circumferential gap 705 has been closed. The stiffness and/or other material properties associated with damping device 600 may be a function the type of material used for the damping body 605, the height 665, and a diameter 655 of the damping body 650 and/or the containment structure 725.

A first range of pedal resistance may be associated with the compression of damping device 600 as the circumferential gap 705 is being filled with the deformed material of damping body 650, and a second range of pedal resistance may be associated with the compression of damping device 600 after the circumferential gap 705 has being filled and the damping body 650 is in contact with the inner surface of containment structure 725.

An industrial vehicle such as a forklift truck may operate in a variety of environments, ranging from the desert heat to sub-zero operating conditions in a freezer room. Certain types of materials used for the damping body 650 may be configured for operation within a particular range of operating temperatures. Some materials may reach a brittle transition point at a threshold operating temperature.

In examples in which damping body 650 may become relatively stiff at temperatures which are below a threshold operating temperature, a heating system 775 may be used. Heating system 725 may be configured to maintain the body temperature of damping device 600 above the threshold operating temperature. Heater system 775 may comprise an electric heater located against, or wrapped around, the surface of containment structure 775. In still other examples, connecting rod 620 may comprise a heating device or electric probe that is configured to maintain the body temperature of damping device 600 above the threshold operating temperature.

Figure 8:
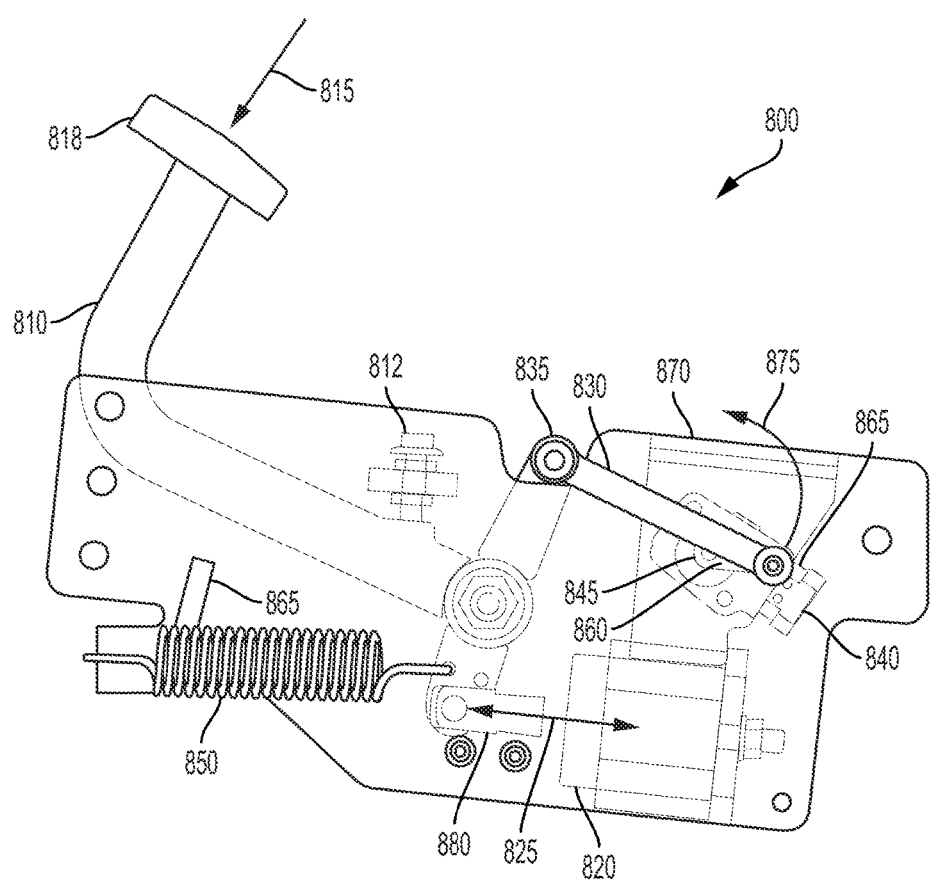
FIG. 8 illustrates an example vehicle braking system configured to control brake pedal effort.

FIG. 8 illustrates an example vehicle braking system 800 configured to control brake pedal effort 815. In conventional mechanical braking systems, the amount of brake pedal effort provided by the operator is a function of the hydraulic system feedback as hydraulic fluid is forced by the master cylinder into the hydraulic brake lines. In braking systems that do not include or rely upon hydraulic brakes lines, such as vehicle braking system 800, the brake pedal effort 815 may be controlled by a pedal effort simulation device 820. Additionally, the braking force provided by the vehicle brakes may be electronically controlled by a brake pedal sensing device 840.

Similar to that discussed with respect to the braking system 200 of FIG. 2, as the operator depresses a brake pedal 818, a pedal arm 810 may be configured to move and/or rotate in a downward direction, causing a plunger 880 to move in a linear direction 825 and apply a compressive force against the pedal effort simulation device 820. A the plunger 880 continues to be pressed against the pedal effort simulation device 820 as a result of the downward motion of pedal arm 810, the amount of the pedal effort 815 that is required to move the plunger 880 becomes greater as the pedal effort simulation device 820 provided increasingly greater resistance against the movement of the plunger. In some examples, pedal effort simulation device 820 may be configured similarly as pedal effort simulation device 700 of FIG. 7, including a damping device that deforms in response to the compressive force applied by plunger 880.

In addition to being operatively coupled to plunger 880, pedal arm 810 may be operatively coupled to additional braking linkage including pedal position arm 830. A first end of pedal position arm 830 may be coupled to pedal arm 810 at first pivot 835. Pedal position arm 830 may be configured to rotate relative to first pivot 835 as pedal arm 810 is depressed.

Brake pedal sensing device 840 may be attached to sensor housing 870 by a sensor pin 845. A sensor arm 860 may be operatively coupled to brake pedal sensing device 840 via sensor pin 845. Additionally, sensor arm 860 may be operatively coupled to pedal position arm 830 at a second pivot 865. Pedal position arm 830 may be configured to rotate relative to both first pivot 835 and second pivot 865 in response to the movement of pedal arm 810. Similarly, sensor arm 860 may be configured to rotate 875 relative to sensor pin 845 in response to the movement of pedal position arm 830.

In some examples, brake pedal sensing device 840 may comprise a near-field sensor, such as a Hall-effect sensor, that is configured to detect the relative position or rotational angle of sensor arm 860. In other examples, brake pedal sensing device 840 may comprise a magnetic sensor, a rotary sensor, a linear position sensor, other types of sensors, transducers, encoders, and any combination thereof.

Both the linear movement 825 of plunger 880 and the rotational movement 875 of sensor arm 860 may be limited and/or constrained by one or both of an up-stop 812 and a down-stop 865. Up-stop 812 may be configured to contact or otherwise limit the upward motion of pedal arm 810, such as when a return spring 850 operates to raise the brake pedal 818 to an upright, neutral, or non-braking position. Similarly, down-stop 865 may be configured to contact or otherwise limit the downward motion of pedal arm 810. In some examples, the location of one or both up-stop 812 and down-stop 865 may be changed to vary the range of motion of pedal arm 810.

The range of motion of sensor arm 860 may similarly be adjusted by varying the range of motion of pedal arm 810. Sensing device 840 may be configured to monitor a range of motion of sensor arm 860 from a minimum position associated with brake pedal 818 in the upright, neutral, or non-braking position, to a maximum braking position associated with brake pedal 818 in the fully depressed position, such as when pedal arm 810 contacts down-stop 865. In some examples, sensing device 840 may be configured to monitor the range of motion of sensor arm 860 over forty-five degrees of travel or more.

As brake pedal 818 is pressed causing sensor arm 860 to rotate, vehicle braking system 800 may be configured to apply regenerative braking, e.g., via an electronic brake assembly. Actuation of pedal effort simulation device 820 may operate to simulate the feel of a master cylinder in a conventional hydraulic brake assembly.

In some examples, pedal effort simulation device 820 may provide a resistance in response to the linear movement 825 of plunger 880 that results in a brake pedal effort 815 that approximately corresponds to the brake pedal effort associated with a hydraulic force that is generated in a hydraulic brake line. The brake pedal effort 815 may vary as a non-linear function of the linear movement 825 of the plunger 880.

An operator that works on multiple vehicles may therefore experience a similar braking experience regardless if a vehicle is equipped with hydraulically controlled brakes, or if another vehicle is equipped with electronically controlled brakes. An example braking operation associated with vehicle braking system 800 is described as follows.

A processing device may be configured to control an amount of braking force provided by the vehicle braking system 800 as a function of the position of the service brake pedal 818. The return spring 850 may be operatively coupled to the service brake pedal 818 and configured to provide a substantially linear pedal effort feedback during an initial range of motion of the service brake pedal 818. Pedal effort simulation device 820 may be configured to operate in compression as the service brake pedal 818 is depressed. The pedal effort simulation device 820 may be configured to provide a substantially non-linear pedal effort feedback during a subsequent range of motion of the service brake pedal 818.

Pedal effort simulation device 820 may comprise a containment structure and an elastically deformable body at least partially confined within the containment structure. The elastically deformable body may be configured to deform in response to the confinement within the containment structure. The deformation of the elastically deformable body may result in the substantially non-linear pedal effort feedback provided by the pedal effort simulation device 820.

The containment structure may be cylindrical in shape, and an annular space may be formed between the elastically deformable body and an inner surface of the containment structure. The elastically deformable body may be configured to radially deform into the annular space during the initial range of motion of the service brake pedal. The annular space may be completely occupied by the elastically deformable body during the subsequent range of motion of the service brake pedal, such that the elastically deformable body contacts the inner surface of the containment structure.

The containment structure may comprise a lower surface against which the elastically deformable body is compressed, and the elastically deformable body may be attached to the lower surface by a retention device. The retention device may comprise a first stud plate, and a second stud plate located on an opposite face of the elastically deformable body may be configured to evenly distribute a compressive force through the elastically deformable body. The second stud plate may be operatively coupled to the brake pedal 818 via a clevis assembly. The clevis assembly may be operatively coupled to both the second stud plate and the return spring 850.

Sensor arm 860 may be operatively coupled to the service brake pedal 818 via various brake pedal linkage. The sensor arm 860 may be configured to be displaced during both the initial range of motion of the service brake pedal 818 and the subsequent range of motion of the service brake pedal 818. The sensing device 840 may be configured to monitor the position of the service brake pedal 818 based on the displacement of the sensor arm 860. Sensing device 840 may be configured to generate a voltage signal that varies as a function of the displacement of the sensor arm 860. The processing device may be configured to control the amount of braking force provided by the vehicle braking system in response to receiving the voltage signal.

The sensing device 840 may comprise a dual channel Hall-effect sensor assembly that is configured to generate two voltage signals. The processing device may be configured to compare the two voltage signals to determine if there is a failure in the sensing device 840 and, in response to detecting a failure, disabling the vehicle braking system and actuating a parking brake. In some examples, the parking brake may otherwise not be configured to actuate in response to the monitored position of the service brake pedal 818.

Figure 9:
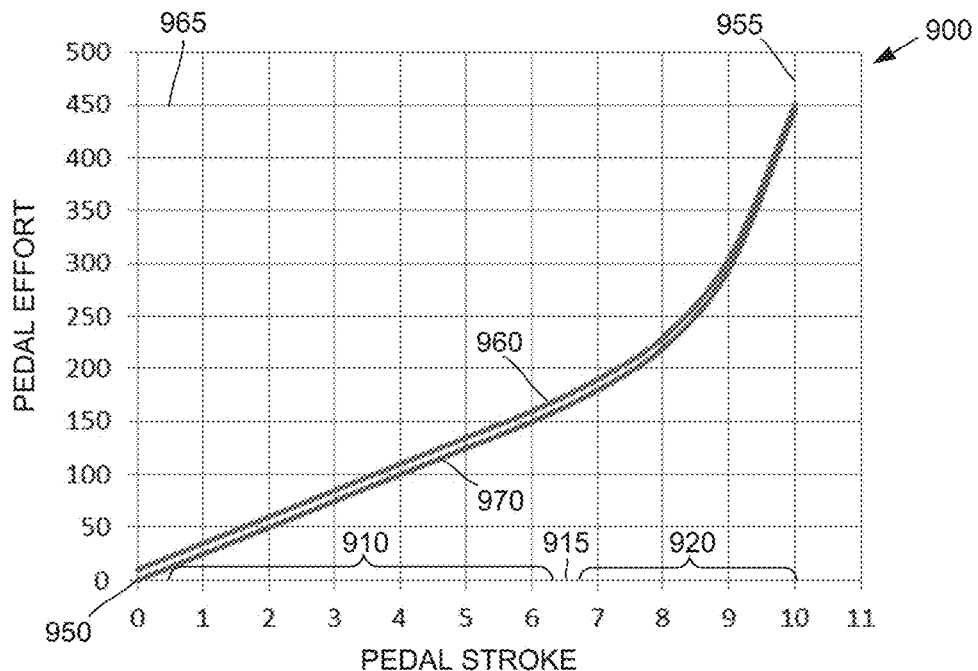
FIG. 9 illustrates a graphical representation of brake pedal effort as a function of pedal stroke.

FIG. 9 illustrates a graphical representation 900 of brake pedal effort. The graph may be understood to represent an amount of pedal effort (y-axis) versus pedal stroke (x-axis). A first force-displacement curve 960 may be understood to represent the behavior of a brake pedal effort simulation device, such as damping device 600 of FIG. 6 and/or brake pedal effort simulation device 700 of FIG. 7, during the down-stroke of the brake pedal. Additionally, a second force-displacement curve 970 may be understood to represent the behavior of the brake pedal effort simulation device during the return, or up-stroke of the brake pedal.

The pedal stroke is represented by increments ranging from a minimum pedal stroke at position 950, to a maximum pedal stroke 955. The increments of pedal stroke may be understood to represent degrees of rotation of the brake pedal arm or the distance travelled of the brake pedal. Minimum pedal stroke 950 may be associated with zero degrees of rotation, such as when the brake pedal is located at an upright, neutral, or non-braking position. In some examples, maximum pedal stroke 955 may be associated with approximately ten degrees or more of rotation from the neutral position, such as when the brake pedal is located at a fully depressed or maximum braking position.

Similarly, the pedal effort is represented by increments ranging from a minimum pedal effort at position 950, to a maximum pedal effort 965. The increments of pedal effort may be understood to represent units of force, such as Newton (N). Minimum pedal effort 950 may be associated with the brake pedal located at the upright, neutral, or non-braking position, in which a nominal amount of pedal effort may initially be required to depress the brake pedal such as approximately 10 N of force. In some examples, maximum pedal effort 965 may be associated with approximately 450 N of force, when the brake pedal is being fully depressed at the maximum pedal stroke 955, however, greater or smaller pedal effort forces are contemplated herein.

During an initial range of pedal stroke 910, force-displacement curve 960 may be substantially linear in function, in that the amount of pedal effort provided by the brake pedal effort simulation device may be substantially proportional to the amount of pedal stroke. On the other hand, during a second range of pedal stroke 920, force-displacement curve 960 may be non-linear, in that the amount of pedal effort provided by the brake pedal effort simulation device is not directly proportional to the amount of pedal stroke. In some examples, the rate of change of pedal effort in the second range of pedal stroke 920 may be greater than the rate of change of pedal effort in the initial range of pedal stroke 920.

As the brake pedal transitions from the initial range of pedal stroke 910 to the second range of pedal stroke 920, at transition region 915, the rate of change of pedal effort provided by the brake pedal effort simulation device may gradually increase from the substantially linear pedal force associated with the initial range of pedal stroke 910 to the increasingly non-linear curve associated with the second range of pedal stroke 920.

In some examples, the initial range of pedal stroke 910 may be associated with relatively light duty braking operations, in which the vehicle may gradually be slowed or come to a stop. The second range of pedal stroke 920 may be associated with more heavy duty braking, in which additional braking force is applied to the vehicle so that it slows down more quickly. At or near the maximum pedal effort 965 in the second range of pedal stroke 920, the maximum braking force may be applied to bring the vehicle to stop as quickly as possible.

Transition region 915 may be configured to provide the operator of the vehicle with a gradual transition between the relatively light duty braking associated with the initial range of pedal stroke 910 and the relatively heavy duty braking associated with the second range of pedal stroke 920, such that there is not an abrupt change in pedal effort between light and heavy duty braking. Additionally, the gradual change in pedal effort provided by the brake pedal effort simulation device may allow the operator to maintain fine control of the vehicle brakes throughout the full range of pedal stroke.

The initial range of pedal stroke 910 may be associated with a spring force. For example, the spring force may be provided by a return spring such as return spring 850 of vehicle braking system 800 (FIG. 8). A linear spring force may be provided by the return spring operating in tension. During the initial range of pedal stroke 910, a damping device, such as damping device 600 of FIG. 6, may be partially compressed. For example, the damping device 600 may be partially compressed within the circumferential gap 705 formed between the body 650 of damping device 600 and containment structure 725 (FIG. 7). Damping device 600 may be configured to provide an initial damping force as it is partially compressed into circumferential gap 705.

During the initial range of pedal stroke 910, the spring force associated with the return spring operating in tension may be substantially greater than the initial damping force provided by the damping device, such that the general shape of force-displacement curve 960 in the initial range of pedal stroke 910 may largely be dominated by the linear spring force associated with the return spring.

In some examples, transition region 915 may be understood to occur when the body 650 of damping device 600 has deformed to the point where the circumferential gap 705 has been substantially filled or substantially filled. As the brake pedal continues to be depressed beyond transition region 915, the damping force associated with the continued compression of the damping device 600 may become substantially greater than the spring force provided by the return spring, such that the general shape of force-displacement curve 960 in the second range of pedal stroke 920 may largely be dominated by the non-linear damping force associated with the damping device 600.

The shape of second force-displacement curve 970 may be associated with a reverse process as that described above for force-displacement curve 960. For example, force-displacement curve 970 may transition from the second range of pedal stroke 920 to the initial range of pedal stroke 910. The pedal effort associated with second force-displacement curve 970 may be less than the pedal effort associated with force-displacement curve 960 for one or more of the corresponding pedal stroke values. In some examples, the decreased pedal effort may result from a hysteresis effect of the decompressing damping device as the brake pedal is returned to the upright, neutral, or non-braking position.

Figure 10:
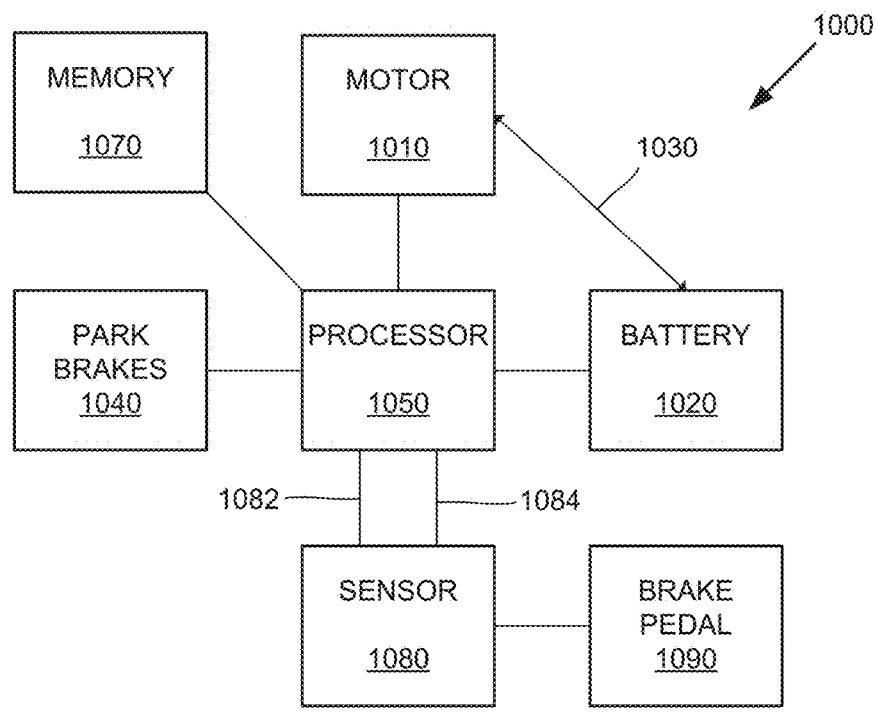
FIG. 10 illustrates an example vehicle braking system configured to provide electronically actuated brakes.

FIG. 10 illustrates an example vehicle braking system 1000 configured to provide regenerative braking. The regenerative braking may be provided, at least in part, by an electric drive motor 1010 and an energy storage device such as a battery 1020. Braking effort provided during service braking of the vehicle braking system 1000 may be accomplished entirely by regenerative braking. Operator control of the regenerative braking, or service brakes 1030, may be achieved in response to a processing device 1050 receiving one or more signals from sensing device 1080 based on actuation of a brake pedal 1090. Processing device 1050 may be configured to monitor operating conditions and information about vehicle braking system 1000, including when the brake pedal 1090 is depressed and how much it is depressed.

Sensing device 1080 may comprise a position sensor that is configured to monitor the position of brake pedal 1090. Based on the monitored position, processing device 1050 may be configured to vary the amount of braking force applied by service brakes 1030. Additionally, based on the monitored position of brake pedal 1090, processing device 1050 may be configured to vary the amount of energy that is regenerated via the motor 1010 and/or battery 1020.

Sensing device 1080 may comprise a dual channel Hall-effect sensor. The dual signals associated with sensing device 1080 may provide for redundancy and/or verification of braking control. The dual signals may be generated independent of each other, for examples by two sensors located within sensing device 1080. Additionally, each of the two sensors may be associated with a separate power supply and a separate ground to remain independent from each other.

A first signal 1082 generated by sensing device 1080 may be configured as a fraction of the voltage associated with a second signal 1084 generated by sensing device 1080, for the same monitored event. In some examples, the first signal voltage may be approximately one half the second signal voltage. Accordingly, processing device 1050 may be configured to compare the voltages associated with the dual signals 1082, 1084, and if the results deviate from the expected difference in voltages by more than a threshold amount, processing device 1050 may indicate a failure event associated with sensing device 1080.

In the event that any failure in vehicle braking system 1000 is detected, processing device 1050 may be configured to actuate the park brakes 1040. The park brakes 1040 may comprise electronically actuated brakes located at or near the wheels. The park brakes 1040 may be configured to engage the wheels, or drive axle, in response to a loss of electrical power. The park brakes 1040 may be actuated independently of the service brakes 1030 and, similarly, the service brakes 1030 may be actuated independently of the park brakes 1040.

The park brakes 1040 may be engaged in response to the operator pressing an emergency stop button. In some examples, the park brakes 1040 and the service brakes 1030 may be mutually exclusive. That is, the park brakes 1040 may not be actuated when regenerative braking is being applied and, conversely, regenerative braking may not be actuated when the park brakes 1040 are being applied. Unlike hybrid braking systems with regenerative brakes that rely upon a park brake system for heavy service braking, electronic braking system 1000 may rely exclusive on the motor 1010 to provide all vehicle service braking.

The vehicle braking system 1000 may be understood to use the motor 1010 for all service braking, without using a hydraulic drum or disc brake of conventional hydraulic or hybrid braking systems. In addition to reducing the costs of manufacturing, the elimination of a master cylinder, brake lines, and disc brakes may result in improved vehicle efficiency. The energy that was turned into brake heat and wasted in conventional braking systems may instead be regenerated into the vehicle's battery 1020, fuel cell, capacitor bank, other types of energy storage device, or any combination thereof.

Vehicle braking system 1000 may provide for more finely tuned modulation control of the service brakes 1030 than conventional hydraulic service brake systems. For example, vehicle braking system 1000 may be configured to modulate braking force during actuation of the brake pedal 1090, providing the operator with precise control of vehicle service braking. Additionally, electronic braking system 1000 may be understood to provide smooth, non-linear feedback to the operator in the form of brake pedal effort during one or more ranges of motion of the service brake pedal.

Processing device 1050 may be configured to communicate with some or all of the other components of vehicle braking system 1000, including motor 1010, battery 1020, park brakes 1040, sensing device 1080, and other vehicle components. The communication may comprise an electronic handshake in which the components provide an identifier or other type of confirmation that the components are compatible with vehicle braking system 1000. If any component fails to provide the expected handshake, processing device 1050 may be configured to prohibit vehicle operation until the components are verified.

Additionally, processing device 1050 may be configured to limit the amount of voltage that is generated during regenerative braking in order to keep the operating temperature of the various components of vehicle braking system 1000 within an allowable operating range of temperatures.

Vehicle braking system 1000 may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

Processing device 1050 may execute instructions or "code" stored in memory 1070. The memory 1070 may store data as well. For example, voltage signals corresponding to a particular amount of braking force may be stored in memory 1070 to provide a lookup table or data set which may be accessed by processing device 1050. The processing device 1050 may include an analog processor, a digital processor, a microprocessor, a multi-core processor, a processor array, a network processor, or the like. Additionally, processing device 1050 may be part of an integrated control system or vehicle system manager, or may be provided as a portable electronic device that may be configured to interface with a networked system, locally and/or remotely, via a wireless transmission.

Figure 11:
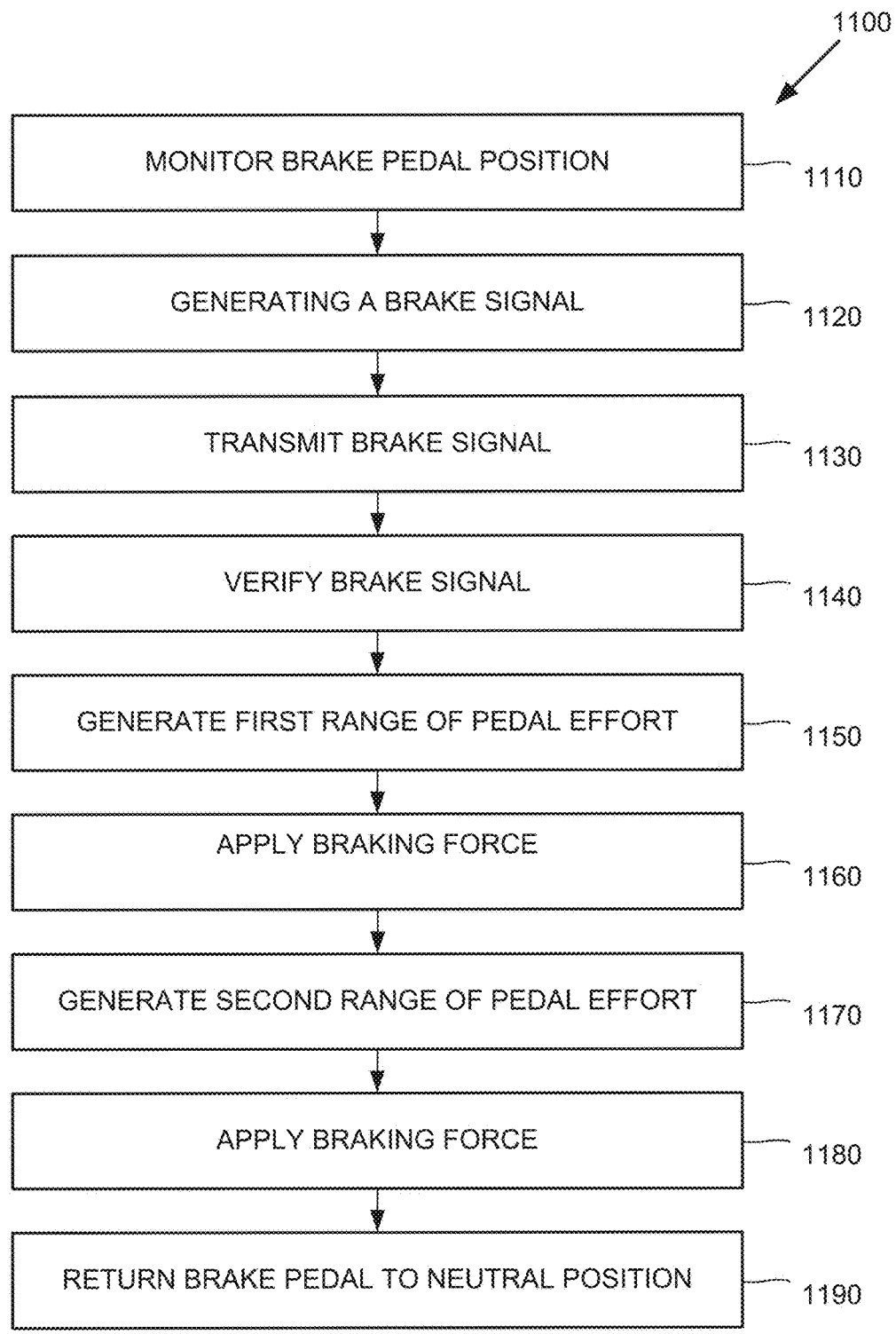
FIG. 11 illustrates an example process of actuating an electronic braking system.

FIG. 11 illustrates an example process 1100 of actuating an electronic braking system. At operation 1110, a brake pedal position associated with a service brake pedal may be monitored by a sensing device.

At operation 1120, a brake signal may be generated as a function of the brake pedal position. In some examples, the brake signal may be generated by the sensing device and may be associated with a particular voltage or other electrical characteristic.

At operation 1130, the brake signal may be transmitted to a vehicle processor. An amount of braking force applied by the electronic braking system may be determined by the vehicle processor based, as least in part, on the brake signal.

At operation 1140, the brake signal may be verified. In some examples, the brake signal may be verified against a second independent signal. The second signal may be generated by a second sensing device or by a dual-path sensor assembly.

At operation 1150 a first range of pedal effort may be generated as operator feedback in response to the service brake pedal being moved through an initial range of pedal stroke. The first range of pedal effort feedback may be generated as a substantially linear function of the brake pedal position within the initial range of pedal stroke. In some examples, generating the first range of pedal effort feedback may comprise placing a return spring in tension. The return spring may be operatively coupled to the service brake pedal via a brake pedal linkage.

At operation 1160, a braking force may be applied to the vehicle. In some examples, the braking force applied during the initial range of pedal stroke may be associated with a relatively gradual or gentle braking operation of the vehicle. The braking force applied during the initial range of pedal stroke may be applied exclusively by a regenerative braking system.

At operation 1170, a second range of pedal effort feedback may be generated in response to the service brake pedal being moved through a subsequent range of pedal stroke. The second range of pedal effort feedback may be generated as a substantially non-linear function of the brake pedal position within the subsequent range of pedal stroke.

In some examples, generating the second range of pedal effort feedback may comprise placing a damping device in compression. Additionally, the damping device may comprise an elastically deformable body made or rubber or neoprene. The elastically deformable body may be placed in compression within a cylindrical container. The second range of pedal effort feedback may be generated as a result of the elastically deformable body being compressed within the cylindrical container.

At operation 1180, a braking force may be applied to the vehicle. In some examples, the braking force applied during the subsequent range of pedal stroke may be associated with a relatively heavy braking operation of the vehicle. The braking force applied during the subsequent range of pedal stroke may be applied exclusively by a regenerative braking system.

At operation 1190, the service brake pedal may be returned to an upright, neutral, or non-braking position. In some examples, the service brake pedal may be returned to the neutral position by the return spring. Additionally, the damping device may also urge the service brake pedal to return to the neutral position as the elastically deformable body of the damping device returns to its original, at rest shape.

Process 1100 and one or more of the associated operations described therein, may be performed by one or more processing devices, such as processing device 1050 of FIG. 10, working in conjunction with one or more of the braking systems illustrated in FIGS. 1-9. For the sake of convenience, the operations are described as various interconnected functional blocks or diagrams. This is not necessary, however, and there may be cases where these functional blocks or diagrams are equivalently aggregated into a single logic device, program or operation with unclear boundaries.

Figure 12:
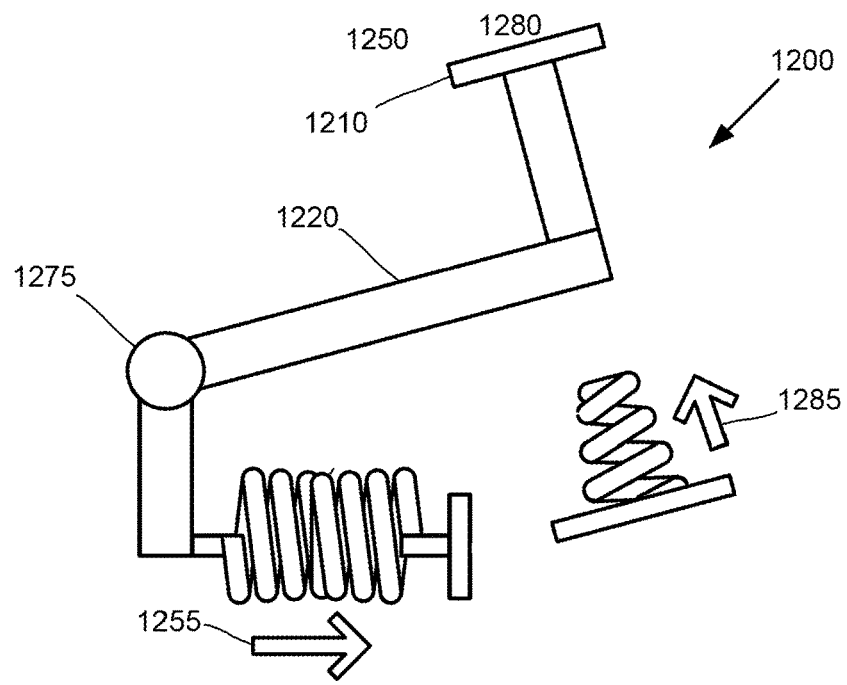
FIG. 12 illustrates an example vehicle braking system with dual-action brake pedal feedback.

FIG. 12 illustrates an example vehicle braking system 1200 with dual-action brake pedal feedback. A brake pedal 120 is shown operatively coupled to a brake arm 1220, and as the operator presses the brake pedal 1210, the brake arm 1220 may rotate about pivot 1275. As brake arm 1220 pivots during a first range of motion, the pedal effort exerted on brake pedal 1210 may be a function off the resistance provided by a first spring device 1250.

First spring device 1250 may be configured to provide a first range of pedal effort 1255 as the brake pedal 1210 is pressed down from an upright, neutral, or non-braking position to a partially depressed position. First spring device 1250 is shown operating in tension as the brake pedal 1210 is depressed, however a compression spring could also achieve a similar pedal effort such as by locating the spring on the opposite side of the pedal arm 1220. In some examples, the first range of pedal effort 1255 may be substantially linear in relationship to the rotation of the brake arm 1220.

When the brake pedal 1210 has reached the partially depressed braking position, the brake arm 1220 may contact a second spring device 1280. Second spring device 1280 may be configured to provide a second range of pedal effort 1285 after the brake pedal 1210 is located in the partially depressed position, until it reaches a fully depressed or maximum braking position. Second spring device 1280 is shown operating in compression as the brake pedal 1210 is depressed, however a tension spring could also achieve a similar pedal effort such as by locating the spring on the opposite side of the pedal arm 1220. In some examples, second spring device 1280 may comprise a helical shaped spring.

During the first range of motion of the brake pedal 1210, the pedal effort feedback may be provided exclusively by first spring device 1250. During the second range of motion of the brake pedal 1210, the overall pedal effort may be provided by both the first spring device 1250 and the second spring device 1280. The pedal effort provided by vehicle braking system 1200 may be used to provide operator feedback in an electronically actuated braking system.

Figure 13:
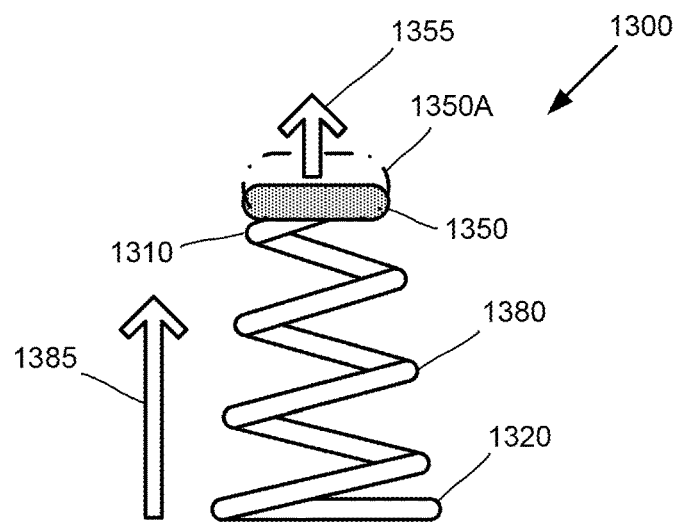
FIG. 13 illustrates an example damping device configured for use in a vehicle braking system.

FIG. 13 illustrates an example damping device 1300 configured for use in a vehicle braking system, such as vehicle braking system 1200 of FIG. 2. In some examples, damping device 1300 may be configured to provide similar functionality as the second spring device 1280. Similarly, damping device 1300 may comprise a spring 1380. Spring 1380 may be helical in shape, with a first end 1310 having a smaller radius of curvature than a second end 1320 of the helical spring.

A bumper 1350 may be operatively coupled to the first end 1310 of the spring 1380. Bumper 1350 may consist of neoprene, latex, silicone, epichlorohydrin (ECH), santoprene, other types of rubber, elastomers, or elastically deformable materials, or any combination thereof. In some examples, bumper 1350 may be hollow and/or may comprise one or more air pockets. A pedal arm, such as pedal arm 1220 (FIG. 12), attached to the service brake pedal may be physically separated from the elastically deformable body 1350 during an initial range of motion of the service brake pedal. The pedal arm may rotate to contact the elastically deformable body 1350 in a subsequent range of motion of the service brake pedal.

Bumper 1350 is shown in a compressed state, which may occur as in response to the brake pedal being depressed. As the bumper 1350 is compressed from its original non-compressed state 1350A to the compressed state, an initial pedal effort feedback 1355 provided by damping device 1300 may be provided primarily by the compression of bumper 1350. After bumper 1350 has been compressed, or partially compressed, an additional pedal effort feedback 1385 provided by damping device 1300 may be provided, at least in part, by the compression of spring 1380.

During an intermediate or transitional state of actuation of damping device 1300, the pedal effort feedback provided by damping device may be provided by a combination of bumper 1350 and spring 1380. The combined pedal effort feedback of damping device 1300 may provide for a non-linear feedback response, similar to second range of pedal stroke 920 of FIG. 9, during at least part of the actuation of damping device 1300. Additionally, in a vehicle braking system comprising dual springs, such as vehicle braking system 1200 of FIG. 12, damping device 1300 may be configured to provide a smooth transition between the initial pedal effort feedback provided by the first spring device 1250 and the additional pedal effort feedback provided by the second spring device 1280.

Bumper 1350 may comprise an elastically deformable body that begins to deform during a transition period between the initial range of motion and the subsequent range of motion of the service brake pedal. The deformation of the elastically deformable body may result in the substantially non-linear pedal effort feedback provided by the damping device 1300 during the subsequent range of motion of the service brake pedal. In some examples, the elastically deformable body may consist of rubber or neoprene.

Bumper 1350 may be attached to the compression spring, such that a substantially non-linear pedal effort feedback is provided by the damping device 1300 during the subsequent range of motion of the service brake pedal as the elastically deformable body is being deformed and the spring 1380 is being compressed.

The above examples are provided for illustrative purposes only, and other types and/or combinations of sensors, systems, vehicles, and environmental parameters are contemplated herein. Although various examples described herein may relate to industrial vehicles such as forklifts, one or more of the examples system may also be used for electric-powered and/or hybrid vehicles such as golf carts, off-highway vehicles, personal transportation vehicles, Automated, Guided Vehicles (AGV), and other types of vehicles that may utilize a non-hydraulic braking system.

Whereas one of skill in the art would appreciate that a braking force or brake torque may be provided, at least in part, by a hydraulically actuated braking device, some of the examples described herein may be configured to provide braking effort by use of other types of braking devices including those that may operate by providing electromagnetic or mechanical force, such as a linear actuator, a servo, other types of braking devices, or any combination thereof. Additionally, some or all of the examples provided herein may be compatible with various types of braking systems that may be configured to develop brake torque through friction materials.

Having described and illustrated various examples herein, it should be apparent that other examples may be modified in arrangement and detail. We claim all modifications and variations coming within the spirit and scope of the following claims.

The invention claimed is:

1. A vehicle braking system, comprising:
   a service brake pedal;
   a sensing device configured to monitor a position of the service brake pedal;
   a processing device configured to control an amount of braking force provided by the vehicle braking system as a function of the position of the service brake pedal;
   a return spring operatively coupled to the service brake pedal and configured to provide a substantially linear pedal effort feedback during an initial range of motion of the service brake pedal;
   a damping device that operates in compression as the service brake pedal is depressed, wherein the damping device is configured to provide a substantially non-linear pedal effort feedback during a subsequent range of motion of the service brake pedal; and
   a sensor arm operatively coupled to the service brake pedal and configured to be displaced during both the initial range of motion of the service brake pedal and the subsequent range of motion of the service brake pedal, and wherein the sensing device is configured to monitor the position of the service brake pedal based on the displacement of the sensor arm.

2. The vehicle braking system of claim 1, wherein the damping device comprises:
   a containment structure; and
   an elastically deformable body at least partially confined within the containment structure, wherein the elastically deformable body is configured to deform in response to the confinement within the containment structure, and wherein the deformation of the elastically deformable body results in the substantially non-linear pedal effort feedback provided by the damping device.

3. The vehicle braking system of claim 2, wherein the containment structure is cylindrical in shape, wherein an annular space is formed between the elastically deformable body and an inner surface of the containment structure, and wherein the elastically deformable body is configured to radially deform into the annular space during the initial range of motion of the service brake pedal.

4. The vehicle braking system of claim 3, wherein the annular space is completely occupied by the elastically deformable body during at least a portion of the subsequent range of motion of the service brake pedal, such that the elastically deformable body contacts the inner surface of the containment structure.

5. The vehicle braking system of claim 3, wherein the containment structure comprises a first surface against which the elastically deformable body is compressed, and wherein the elastically deformable body is attached to the first surface by a retention device.

6. The vehicle braking system of claim 5, wherein the retention device comprises a first plate located on a first face of the elastically deformable body and a second plate located on a second face of the elastically deformable body opposite the first face, and wherein the second plate is configured to evenly distribute a compressive force through the elastically deformable body.

7. The vehicle braking system of claim 6, wherein the second plate is operatively coupled to the service brake pedal via a clevis assembly.

8. The vehicle braking system of claim 7, wherein the clevis assembly is operatively coupled to both the second plate and the return spring.

9. The vehicle braking system of claim 1, wherein the damping device comprises an elastically deformable body that begins to deform during a transition period between the initial range of motion and the subsequent range of motion of the service brake pedal, and wherein the deformation of the elastically deformable body results in the substantially non-linear pedal effort feedback provided by the damping device during the subsequent range of motion of the service brake pedal.

10. The vehicle braking system of claim 9, wherein the elastically deformable body comprises a bumper made of rubber or neoprene.

11. The vehicle braking system of claim 9, wherein the damping device further comprises a second spring, wherein the second spring is a compression spring, wherein the elastically deformable body is attached to the compression spring, and wherein the substantially non-linear pedal effort feedback is provided by the damping device during the subsequent range of motion of the service brake pedal as the elastically deformable body is being deformed and the second spring is being compressed.

12. The vehicle braking system of claim 11, wherein the second spring comprises a helical spring formed with a first end having a smaller radius of curvature than a second end of the helical spring, and wherein the elastically deformable body is attached to a first end of the helical spring.

13. The vehicle braking system of claim 9, further comprising a pedal arm attached to the service brake pedal, wherein the pedal arm is physically separated from the elastically deformable body during the initial range of motion of the service brake pedal, and wherein the pedal arm rotates to contact the elastically deformable body at the beginning of the transition period.

14. The vehicle braking system of claim 1, wherein the sensing device is configured to generate a voltage signal that varies as a function of the displacement of the sensor arm, and wherein the processing device controls the amount of braking force provided by the vehicle braking system in response to receiving the voltage signal.

15. The vehicle braking system of claim 14, wherein the sensing device comprises a dual-channel hall effect sensor assembly that is configured to generate two voltage signals, and wherein the processing device is configured to:
   compare the two voltage signals to determine if there is a failure in the sensing device; and
   in response to detecting a failure, disabling the vehicle braking system and actuating a parking brake, wherein the parking brake is otherwise not actuated in response to a monitored position of the service brake pedal.

16. A method of actuating an electronic braking system, comprising:
   monitoring, with a sensing device, a brake pedal position associated with a service brake pedal, wherein the sensing device comprises a dual-channel Hall-effect sensor assembly that is configured to generate two voltage signals;
   generating a brake signal as a function of the brake pedal position;
   transmitting the brake signal, wherein an amount of braking force applied by the electronic braking system is determined based, as least in part, on the brake signal;
   generating a first range of pedal effort feedback in response to the service brake pedal being moved through an initial range of pedal stroke, wherein the first range of pedal effort feedback is generated as a substantially linear function of the brake pedal position within the initial range of pedal stroke; and generating a second range of pedal effort feedback in response to the service brake pedal being moved through a subsequent range of pedal stroke, wherein the second range of pedal effort feedback is generated as a substantially non-linear function of the brake pedal position within the subsequent range of pedal stroke.

17. The method of claim 16, wherein generating the first range of pedal effort feedback comprises placing a return spring in tension, wherein the return spring is operatively coupled to the service brake pedal via a brake pedal linkage, and wherein generating the second range of pedal effort feedback comprises placing a damping device in compression, wherein the damping device comprises an elastically deformable body made of rubber or neoprene.

18. The method of claim 17, wherein the elastically deformable body is placed in compression within a cylindrical container, and wherein the second range of pedal effort feedback is generated as a result of the elastically deformable body being compressed within the cylindrical container.

* * * * *